US012719169B2

(12) United States Patent
Ueda

(10) Patent No.: US 12,719,169 B2
(45) Date of Patent: Aug. 25, 2026

(54) ANTENNA DEVICE, COMMUNICATION DEVICE, AND METHOD FOR MANUFACTURING ANTENNA DEVICE

(71) Applicant: Murata Manufacturing Co., Ltd., Nagaokakyo (JP)

(72) Inventor: Hideki Ueda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 57 days.

(21) Appl. No.: 18/977,955

(22) Filed: Dec. 12, 2024

(65) Prior Publication Data

US 2025/0112373 A1 Apr. 3, 2025

Related U.S. Application Data

(63) Continuation of application No. PCT/JP2023/025306, filed on Jul. 7, 2023.

(30) Foreign Application Priority Data

Aug. 10, 2022 (JP) ................................ 2022-127797

(51) Int. Cl.
*H01Q 9/04* (2006.01)
*H01Q 1/24* (2006.01)
*H01Q 1/48* (2006.01)

(52) U.S. Cl.
CPC ........... *H01Q 9/0471* (2013.01); *H01Q 1/241* (2013.01); *H01Q 1/48* (2013.01)

(58) Field of Classification Search
CPC ........ H01Q 9/0471; H01Q 1/241; H01Q 1/48; H01Q 1/243; H01Q 21/08; H01Q 21/28; H01Q 1/38; H01Q 13/08; H01P 11/00
See application file for complete search history.

(56) References Cited

U.S. PATENT DOCUMENTS 9,905,922 B2 * 2/2018 Lee ........................ H01Q 1/243
2013/0050056 A1 * 2/2013 Lee .......................... H01Q 3/30
343/893
2019/0319341 A1 * 10/2019 Park ..................... H01Q 21/065
2021/0057812 A1 2/2021 Yun et al.

FOREIGN PATENT DOCUMENTS

WO 2020/170722 A1 8/2020
WO 2020/261806 A1 12/2020
WO 2020/261807 A1 12/2020

OTHER PUBLICATIONS

International Search Report and Written Opinion mailed on Aug. 29, 2023, received for PCT Application PCT/JP2023/025306, filed on Jul. 7, 2023, 9 pages including English Translation.

* cited by examiner

*Primary Examiner* — David E Lotter
(74) *Attorney, Agent, or Firm* — XSENSUS LLP

(57) ABSTRACT

A first portion and a second portion are connected to a first surface of a connection portion having the first surface and a second surface opposite to the first surface. A first radiating element is disposed on the first portion, and a second radiating element is disposed on the second portion. The connection portion includes a first flat board portion, a bent portion extending from the first flat board portion, and bent to have the first surface facing outward, and a second flat board portion further extended from the bent portion.

20 Claims, 14 Drawing Sheets

ANTENNA DEVICE, COMMUNICATION DEVICE, AND METHOD FOR MANUFACTURING ANTENNA DEVICE

CROSS-REFERENCE TO RELATED APPLICATIONS

This is a continuation application of PCT/JP2023/025306, filed on Jul. 7, 2023, designating the United States of America, which is based on and claims priority to Japanese Patent Application No. JP 2022-127797 filed on Aug. 10, 2022. The entire contents of the above-identified applications, including the specifications, drawings and claims, are incorporated herein by reference in their entirety.

TECHNICAL FIELD

The present disclosure relates to an antenna device, a communication device, and a method for manufacturing an antenna device.

BACKGROUND ART

A communication device such as a mobile terminal is desired to have functions of receiving radio waves from various directions, and radiating radio waves in various directions. To satisfy this desire, antennas are needed to be disposed on many surfaces of the housing. A known antenna device includes two flat board portions having different normal directions and connected with a bent portion (Patent Document 1). The two flat board portions and the bent portion are manufactured by processing a single flat board to have a thin portion, and bending the board at the thin portion.

The two flat board portions include multiple protrusions raised above the bent portion and protruding toward the bent portion from a boundary between the flat board portions and the bent portion. The multiple protrusions have a protruding length set not to spatially interfere with one another in a state where the board has not been bent at the bent portion (FIG. 20 in Patent Document 1). Alternatively, the protrusions on one of the flat board portions and the protrusions on the other flat board portion alternate in the direction parallel to the intersection line of the two planes along which the two flat board portions extend (FIG. 22 in Patent Document 1). A radiating element is disposed on each of the protrusions on the two flat board portions.

CITATION LIST

Patent Document

Patent Document 1: International Publication No. 2020/170722

SUMMARY OF DISCLOSURE

Technical Problem

In the known antenna device (FIG. 20 in Patent Document 1), the multiple protrusions have a protruding length restricted not to spatially interfere with one another in a state where the board has not been bent at the bent portion. The restriction on the protruding length of the protrusions also restricts the size of the radiating elements disposed on the protrusions.

In the known antenna device (FIG. 22 in Patent Document 1), the protrusions on one of the flat board portions and the protrusions on the other flat board portion alternate in the direction parallel to the above intersection line to ease the restriction on the protruding length of the protrusions. However, the multiple radiating elements disposed on the protrusions on one of the flat board portions are not allowed to be disposed within the range, in the direction parallel to the intersection line, in which the protrusions on the other flat board portion are disposed. This structure thus restricts the freedom of arrangement of the radiating elements.

A feature of the present disclosure is to provide an antenna device that eases the upper limit on the dimensions of multiple radiating elements disposed on two surfaces, having different normal directions, connected to each other with a bent portion, and that has higher freedom of arrangement, and to provide a method for manufacturing the antenna device. Another feature of the present disclosure is to provide a communication device including the antenna device.

Solution to Problem

A first aspect of the present disclosure provides an antenna device that includes

- a board-shaped connection portion having a first surface and a second surface opposite to the first surface;
- a board-shaped first portion and a board-shaped second portion connected to the first surface of the connection portion;
- a first radiating element disposed on the first portion; and
- a second radiating element disposed on the second portion,
- wherein the connection portion includes
  - a first flat board portion,
  - a bent portion extending from the first flat board portion, and bent to have the first surface facing outward, and
  - a second flat board portion further extended from the bent portion,
- wherein the first portion includes a first extension portion connected to the first surface in the first flat board portion, and extending toward the bent portion from a boundary between the first flat board portion and the bent portion,
- wherein the second portion includes a second extension portion connected to the first surface in the second flat board portion, and extending toward the bent portion from a boundary between the second flat board portion and the bent portion,
- wherein at least a part of the first extension portion and at least a part of the second extension portion are located at the same position in a first direction parallel to an intersection line of a plane along which the first flat board portion extends and a plane along which the second flat board portion extends,
- wherein a first distance is a distance from a first reference plane to a surface intersecting a thickness direction of the first extension portion in a direction perpendicular to the first reference plane, and the first reference plane is orthogonal to the first surface in the first flat board portion and parallel to the first direction,
- wherein a second distance is a distance from a second reference plane to a surface intersecting a thickness direction of the second extension portion in a direction perpendicular to the second reference plane, and the second reference plane is orthogonal to the first surface in the second flat board portion and parallel to the first direction, wherein a third distance is a shortest distance along the first surface from the first reference plane to the second reference plane, wherein a sum of the first distance and the second distance at the same height from the first surface is smaller than or equal to the third distance, and wherein a sum of a maximum value of the first distance and a maximum value of the second distance is longer than the third distance.

Another aspect of the present disclosure provides a communication device that includes the antenna device; and a circuit that provides high frequency signals to the first radiating element and the second radiating element.

Another aspect of the present disclosure provides a method for manufacturing an antenna device that includes forming a first radiating element and a second radiating element respectively on a board-shaped first portion and a board-shaped second portion;

bonding, to a first surface serving as a first surface of a board having flexibility, the first portion and the second portion in a positional relationship where at least a part of the first radiating element overlaps the second portion when the first surface is viewed in a plan without bonding, to the board, portions of the first portion and the second portion that overlap each other; and bending a part of the board not bonded to the first portion and the second portion to have the first surface facing outward to allow the portions of the first portion and the second portion that overlap each other to raise above the bent part of the board.

Advantageous Effects of Disclosure

The first portion and the second portion do not spatially interfere with each other regardless of when the bent portion is deformed into a flat board shape while being connected to a connection portion. This structure thus allows the first portion and the second portion to be fixed to the connection portion while the connection portion is in a flat state. After the first portion and the second portion are fixed to the connection portion, the connection portion is allowed to be bent. This structure can improve the workability in the manufacturing process further than a method with which the first portion and the second portion are fixed to a bent connection portion.

The sum of the maximum value of the first distance and the maximum value of the second distance is longer than the third distance. This structure further eases the restriction on the dimensions of the first radiating element disposed on the first extension portion than the known antenna device illustrated in FIG. 20 in Patent Document 1. At least a part of the first extension portion and at least a part of the second extension portion are located at the same position in a direction parallel to an intersection line of a plane along which the first flat board portion extends and a plane along which the second flat board portion extends. Thus, unlike in the known antenna device illustrated in FIG. 22 in Patent Document 1, the first radiating element and the second radiating element can be disposed at the same position in the direction parallel to the intersection line. Thus, the radiating element can be arranged more freely.

DESCRIPTION OF EMBODIMENTS

First Embodiment

With reference to FIG. 1A to FIG. 2C, an antenna device according to a first embodiment is described.

Figure 1A:
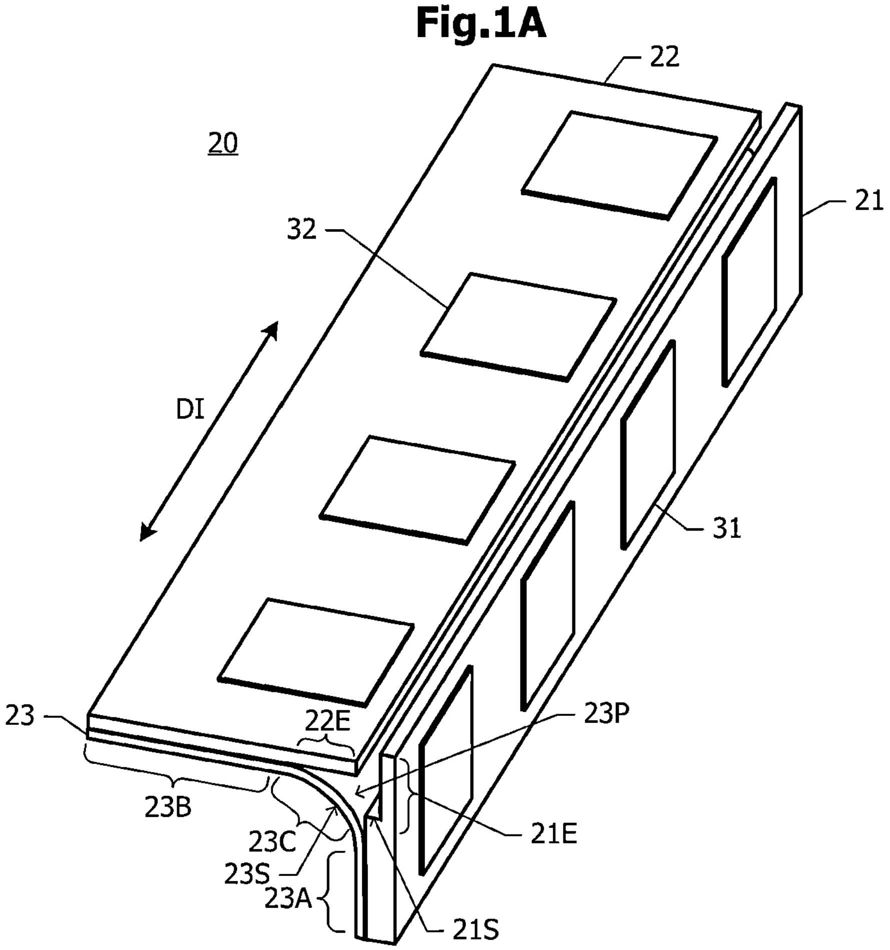
FIG. 1A and FIG. 1B are respectively a perspective view and a cross-sectional view of an antenna device according to a first embodiment.
Figure 1B:
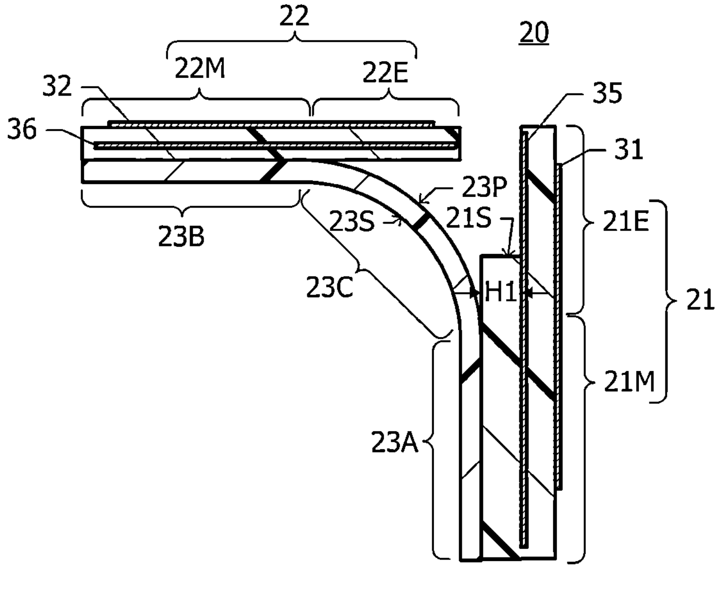

FIG. 1A and FIG. 1B are respectively a perspective view and a cross-sectional view of an antenna device 20 according to a first embodiment. The antenna device 20 according to the first embodiment includes a board-shaped first portion 21, a board-shaped second portion 22, and a connection portion 23 that connects these portions. Multiple first radiating elements 31 are disposed on the first portion 21, and multiple second radiating elements 32 are disposed on the second portion 22.

The connection portion 23 is a board-shaped member having a first surface 23P and a second surface 23S opposite to the first surface 23P. The connection portion 23 includes a flat-board-shaped first flat board portion 23A, a bent portion 23C extending from the first flat board portion 23A and bent to have the first surface 23P facing outward, and a flat-board-shaped second flat board portion 23B further extending from the bent portion 23C. The first surface 23P in the bent portion 23C has a prismatic surface, such as a cylindrical surface or a cylindroid surface. Hereafter, the direction in which the first surface 23P of the connection portion 23 faces may be referred to as "an outward direction", and the direction in which the second surface 23S of the connection portion 23 faces may be referred to as "an inward direction".

The first flat board portion 23A and the bent portion 23C are smoothly continued at their boundary, and the bent portion 23C and the second flat board portion 23B are also smoothly continued at their boundary. A bending angle of the bent portion 23C is, for example, 90°. The bending angle may be a different degree.

The first portion 21 and the second portion 22 are respectively connected to the first surface 23P of the connection portion 23 in the first flat board portion 23A, and the first surface 23P of the connection portion 23 in the second flat board portion 23B. For example, a metal pattern (not illustrated) is disposed on the first surface 23P in the first flat board portion 23A, a part of the inner surface of the first portion 21, the first surface 23P in the second flat board portion 23B, and a part of the inner surface of the second portion 22. The first portion 21 and the first flat board portion 23A are soldered to each other, and the second portion 22 and the second flat board portion 23B are soldered to each other.

The first portion 21 includes a first extension portion 21E extending toward the bent portion 23C from a boundary between the first flat board portion 23A and the bent portion 23C. Similarly, the second portion 22 includes a second extension portion 22E extending toward the bent portion 23C from a boundary between the second flat board portion 23B and the bent portion 23C. The first extension portion 21E and the second extension portion 22E are raised above the first surface 23P in the bent portion 23C. A portion of the first portion 21 bonded to the connection portion 23 (a portion other than the first extension portion 21E) is referred to as a first bonded joint 21M. Similarly, a portion of the second portion 22 bonded to the connection portion 23 (a portion other than the second extension portion 22E) is referred to as a second bonded joint 22M.

The first extension portion 21E extends throughout from a first end portion to a second end portion of the first portion 21 in a direction DI parallel to the intersection line (hereinafter may also be simply referred to as "an intersection line" below) of the plane along which the first flat board portion 23A extends and the plane along which the second flat board portion 23B extends. Similarly, the second extension portion 22E extends throughout from a first end portion to a second end portion of the second portion 22 in the direction DI parallel to the intersection line. A virtual plane obtained by extending an inner surface of the second portion 22 from the end of the second extension portion 22E passes through the first extension portion 21E of the first portion 21.

The multiple first radiating elements 31 are arranged on the surface of the first portion 21 facing outward, side by side in the direction DI parallel to the intersection line. The multiple second radiating elements 32 are arranged on the surface of the second portion 22 facing outward, side by side in the direction DI parallel to the intersection line. At least a part of each of the multiple first radiating elements 31 is disposed on the first extension portion 21E. Similarly, at least a part of each of the multiple second radiating elements 32 is disposed on the second extension portion 22E. The multiple first radiating elements 31 and the multiple second radiating elements 32 may be covered with, for example, a protection film without being exposed.

A first ground conductor 35 is disposed in the first portion 21, and each of the multiple first radiating elements 31 and the first ground conductor 35 form a patch antenna. A part of the first ground conductor 35 is disposed in the first extension portion 21E. A second ground conductor 36 is disposed in the second portion 22, and each of the multiple second radiating elements 32 and the second ground conductor 36 form a patch antenna. A part of the second ground conductor 36 is disposed in the second extension portion 22E. A direction from the first ground conductor 35 to the first radiating elements 31 is the same as the direction in which the first surface 23P in the first flat board portion 23A faces. The direction from the second ground conductor 36 to the second radiating elements 32 is the same as the direction in which the first surface 23P in the second flat board portion 23B faces.

The first portion 21 and the second portion 22 do not spatially interfere with each other regardless of when the bent portion 23C is flattened while the first portion 21 and the second portion 22 are connected to the connection portion 23, and are shaped to overlap each other when viewed in a plan while the bent portion 23C is flattened. "Spatially interfering with each other" indicates that multiple members hit against each other in a space and fail to be arranged with an intended positional relationship. Hereinbelow, the shapes of the first portion 21 and the second portion 22 are described.

The surface of the first portion 21 facing inward has a first cliff 21S extending in the direction DI parallel to the intersection line. A portion of the first extension portion 21E located closer to the end with respect to the first cliff 21S has a smaller thickness than a portion of the first extension portion 21E connected to the first flat board portion 23A. The thickness of the second extension portion 22E is equal to or smaller than a height H1 of the first cliff 21S. The first cliff 21S may be located at the same position as the boundary between the first extension portion 21E and the first bonded joint 21M, or in the first extension portion 21E.

When the bent portion 23C is deformed into a flat shape, the end surface of the second extension portion 22E faces the surface of the first cliff 21S. When the first surface 23P is viewed in a plan while the bent portion 23C is deformed into a flat shape, a portion of the first extension portion 21E located closer to the end with respect to the first cliff 21S overlaps the second portion 22. The first cliff 21S prevents the first portion 21 and the second portion 22 from spatially interfering with each other while the bent portion 23C is deformed into a flat shape. "Deforming the bent portion 23C into a flat shape" includes a case where the bent portion 23C is deformed into a flat shape as a thought experiment, in addition to the case where the bent portion 23C is actually deformed into a flat shape regardless of whether the bent portion 23C can be actually deformed into a flat shape. When the bent portion 23C is deformed into a flat shape, the dimension in a bending direction is not changed.

Figure 2A:
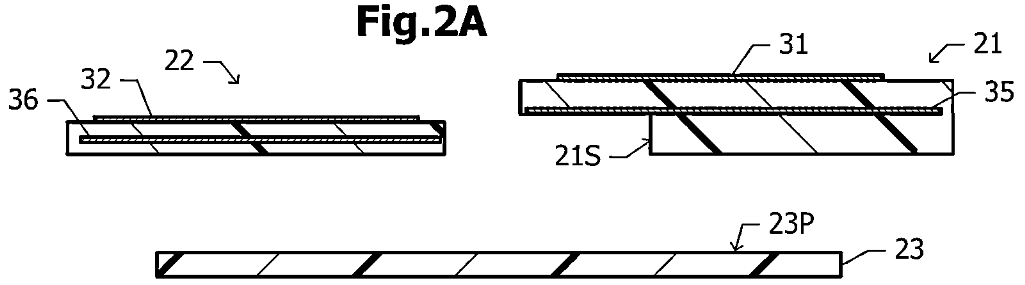
FIG. 2A, FIG. 2B, and FIG. 2C are cross-sectional views of the antenna device according to the first embodiment in the course of manufacture.
Figure 2B:
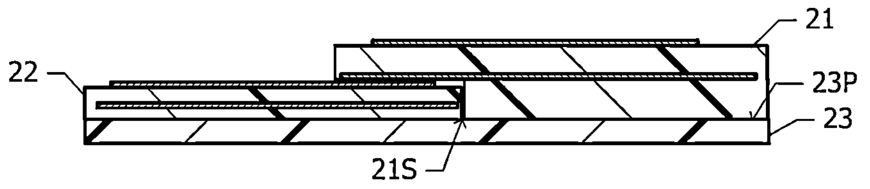
Figure 2C:
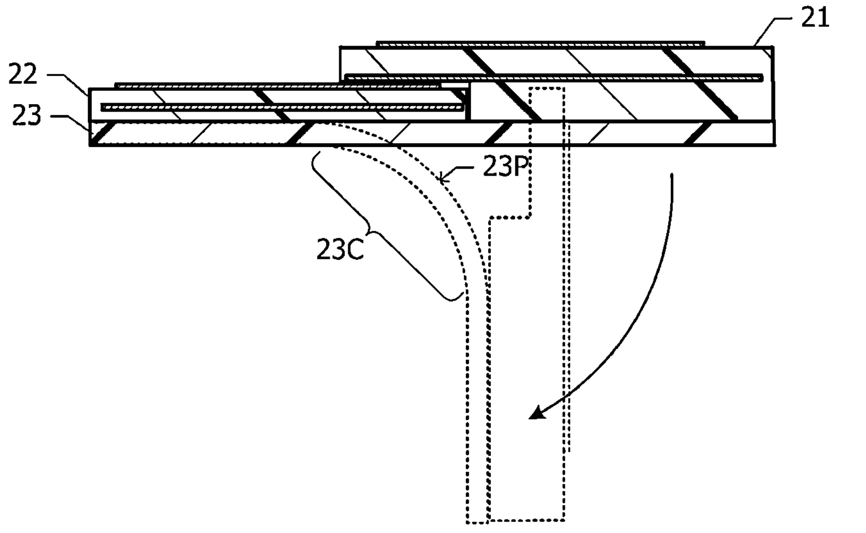

With reference to FIG. 2A, FIG. 2B, and FIG. 2C, a method for manufacturing an antenna device according to a first embodiment is described now. FIG. 2A, FIG. 2B, and FIG. 2C are cross-sectional views of the antenna device according to the first embodiment in the course of manufacture.

As illustrated in FIG. 2A, the first portion 21 and the second portion 22 are manufactured separately. The first portion 21 includes the first cliff 21S, and the first radiating elements 31 and the first ground conductor 35 are disposed on the first portion 21. With respect to the first cliff 21S, one side of the first portion 21 has a smaller thickness than the other side of the first portion 21. The second radiating elements 32 and the second ground conductor 36 are disposed on the second portion 22. In addition, a flat-board-shaped connection portion 23 having flexibility and having the first surface 23P is prepared.

Pads (not illustrated) are disposed on the first portion 21 and the second portion 22 to be bonded to the connection portion 23. Multiple lands (not illustrated) are disposed on the first surface 23P of the connection portion 23. These structures may be manufactured by a method for manufacturing, for example, a known print-circuit board or a low temperature co-fired ceramic substrate.

As illustrated in FIG. 2B, the first portion 21 and the second portion 22 are bonded to the first surface 23P of the connection portion 23. This bonding may be performed using, for example, solder. In an area serving as the bent portion 23C illustrated in FIG. 1B, the first portion 21 and the second portion 22 are not bonded to the first surface 23P. When the first surface 23P is viewed in a plan while the first portion 21 and the second portion 22 are bonded to the flat-board-shaped connection portion 23, a thinner side of the first portion 21 with respect to the first cliff 21S overlaps a part of the second portion 22. One end surface of the second portion 22 faces the first cliff 21S.

The connection portion 23 is bent as indicated with an arrow in FIG. 2C. FIG. 2C illustrates a bent shape with broken lines. A portion of the connection portion 23 not bonded to the first portion 21 and the second portion 22 is bent to form the bent portion 23C. Portions of the first portion 21 and the second portion 22 not bonded to the connection portion 23 are raised from the bent first surface 23P in the bent portion 23C to form the first extension portion 21E and the second extension portion 22E (FIG. 1B).

Preferable effects of the first embodiment are described now.

In the first embodiment, the direction normal to the first flat board portion 23A of the connection portion 23 and the direction normal to the second flat board portion 23B of the connection portion 23 are different. Boresights of the first radiating elements 31 are parallel to the direction normal to the first flat board portion 23A, and boresights of the second radiating elements 32 are parallel to the direction normal to the second flat board portion 23B. Thus, the first radiating elements 31 and the second radiating elements 32 having different boresight directions can be respectively disposed on the first portion 21 and the second portion 22 connected to each other with the connection portion 23.

As illustrated in FIG. 2B, in the first embodiment, the first portion 21 and the second portion 22 are disposed not to spatially interfere with each other in the state where the connection portion 23 has not been bent. Thus, the first portion 21 and the second portion 22 can be bonded to the connection portion 23 before the connection portion 23 is bent. This structure according to the present embodiment facilitates the manufacturing process further than a method with which the first portion 21 and the second portion 22 are bonded to the bent connection portion 23.

As illustrated in FIG. 2B, a part of the first portion 21 overlaps a part of the second portion 22 before the connection portion 23 is bent, and thus the length of the first extension portion 21E and the second extension portion 22E in the extension direction is increased after the connection portion 23 is bent. For example, the extension length of the first extension portion 21E can be increased until a positional relationship, where the virtual plane formed by further extending the inner surface of the second portion 22 from the end of the second extension portion 22E passes through the first extension portion 21E of the first portion 21, is satisfied.

At least a part of each first radiating element 31 and at least a part of each second radiating element 32 are respectively disposed on the first extension portion 21E and the second extension portion 22E. Thus, when the antenna device 20 is disposed at a corner of the inner surface of the housing, the first radiating elements 31 and the second radiating elements 32 can be located near the corner. Thus, the corner space in the housing can be effectively used.

Figure 3:
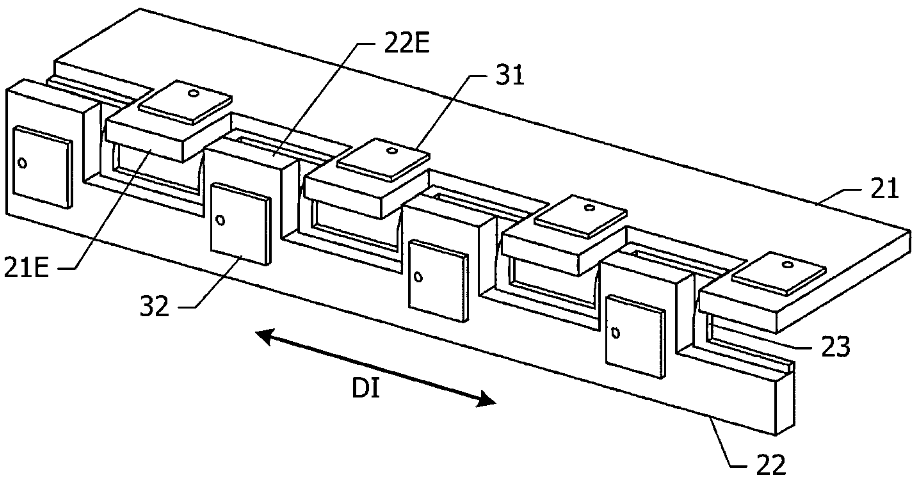
FIG. 3 is a perspective view of an antenna device according to a comparison example.

Preferable effects of the first embodiment are described now in comparison with an antenna device according to a comparison example illustrated in FIG. 3.

FIG. 3 is a perspective view of an antenna device according to a comparison example. The flat-board-shaped first portion 21 and the flat-board-shaped second portion 22 are connected to each other with the bent connection portion 23. The first extension portions 21E of the first portion 21 and the second extension portions 22E of the second portion 22 alternate in the direction DI parallel to the intersection line of the plane along which the first portion 21 extends and the plane along which the second portion 22 extends. The antenna device according to the comparison example has this structure not to allow the first portion 21 and the second portion 22 to spatially interfere with each other while the connection portion 23 is deformed into a flat shape. The first radiating elements 31 and the second radiating elements 32 are respectively disposed on the first extension portions 21E and the second extension portions 22E.

In the comparison example illustrated in FIG. 3, the multiple first extension portions 21E and the multiple second extension portions 22E alternate in the direction DI parallel to the intersection line. Thus, the first radiating elements 31 and the second radiating elements 32 are not allowed to be disposed at the same position in the direction DI parallel to the intersection line. The multiple first extension portions 21E are discretely arranged in the direction DI parallel to the intersection line. Thus, a lower limit value of an interval between the multiple first radiating elements 31 is restricted. Similarly, the lower limit value of an interval between the second radiating elements 32 is also restricted.

In contrast, in the first embodiment, the first extension portion 21E is disposed throughout from a first end to a second end of the first portion 21 in the direction DI parallel to the intersection line. Thus, the first radiating elements 31 and the second radiating elements 32 can be located at the same position in the direction DI parallel to the intersection line. In addition, the multiple first radiating elements 31 can be arranged at smaller intervals. Similarly, the multiple second radiating elements 32 can be arranged at smaller intervals. Thus, when the multiple first radiating elements 31 and the multiple second radiating elements 32 are operated as a phased array antenna, occurrence of grating lobes can be reduced.

Figure 4:
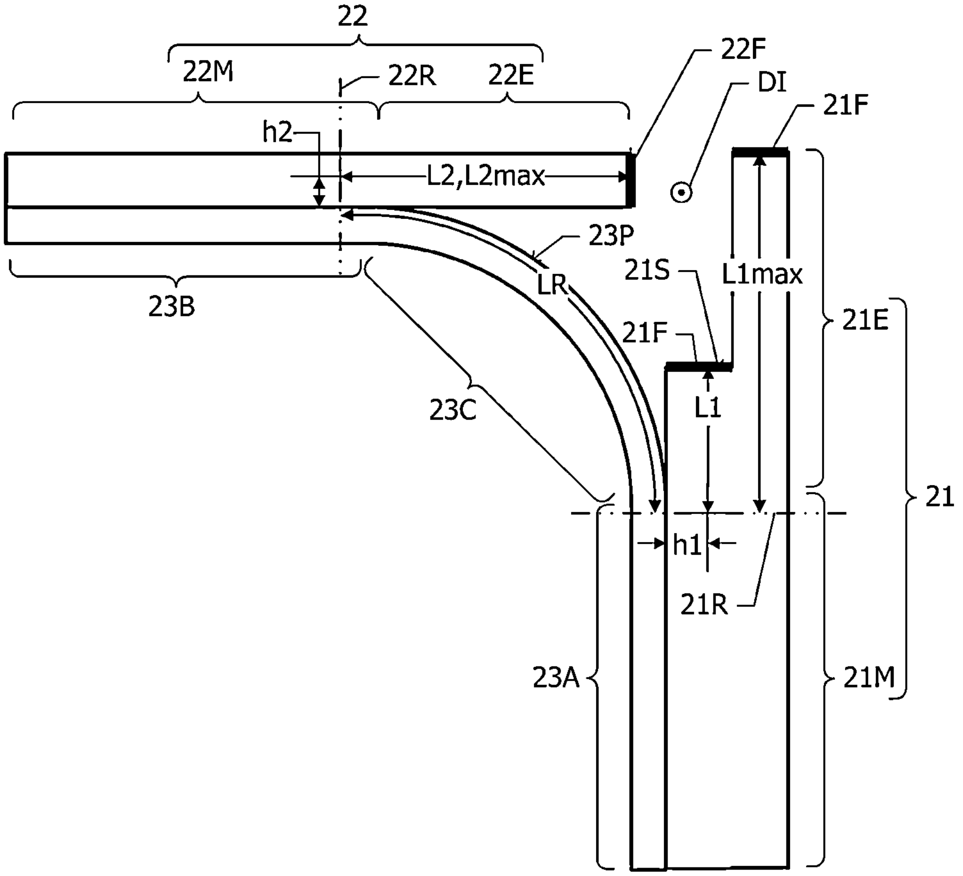
FIG. 4 is a schematic cross-sectional view of the antenna device according to the first embodiment.

With reference to FIG. 4, the dimensions of the first extension portion 21E, the second extension portion 22E, and the bent portion 23C of the antenna device according to the first embodiment are described now. FIG. 4 is a schematic cross-sectional view of the antenna device according to the first embodiment.

The plane orthogonal to the first surface 23P in the first flat board portion 23A and parallel to the direction DI parallel to the intersection line is referred to as a first reference plane 21R, and the plane orthogonal to the first surface 23P in the second flat board portion 23B and parallel to the direction DI parallel to the intersection line is referred to as a second reference plane 22R. A distance from the first reference plane 21R to a surface 21F of the first extension portion 21E intersecting the thickness direction at a height h1 from the first surface 23P in the first flat board portion 23A is referred to as a first distance L1. Similarly, a distance from the second reference plane 22R to a surface 22F of the second extension portion 22E intersecting the thickness direction at a height h2 from the first surface 23P in the second flat board portion 23B is referred to as a second distance L2. In FIG. 4, the surface 21F of the first extension portion 21E parallel to the thickness direction and the surface 22F of the second extension portion 22E parallel to the thickness direction are expressed with relatively bold solid lines. The shortest distance from the first reference plane 21R to the second reference plane 22R along the first surface 23P of the connection portion 23 is referred to as a third distance L3.

The sum of the first distance L1 and the second distance L2 at a position where the height h1 and the height h2 are equal to each other (h1=h2) is smaller than or equal to the third distance L3. In the range where the height h1 is greater than or equal to the height h2 (h1≥h2), the first distance L1 may be longer than the third distance L3.

When the dimensional relationship between the first extension portion 21E, the second extension portion 22E, and the connection portion 23 is set as described above, the first portion 21 and the second portion 22 do not spatially interfere with each other in the state before being bent as illustrated in FIG. 2B. Thus, the antenna device can be manufactured with the manufacturing method illustrated in FIG. 2A, FIG. 2B, and FIG. 2C.

The sum of a maximum value L1max of the first distance L1 and a maximum value L2max of the second distance L2 is longer than the third distance L3. For example, the sum of the maximum value L1Max of the first distance L1 at a portion higher than the height of the first cliff 21S when viewed from the first surface 23P in the first flat board portion 23A and the maximum value L2max of the second distance L2 of the second portion 22 is longer than the third distance L3. This structure can be implemented by employing a structure where a relatively thin portion of one side of the first portion 21 (located closer to the end of the first extension portion 21E) with respect to the first cliff 21S overlaps a part of the second portion 22 when the first surface 23P is viewed in a plan in the state illustrated in FIG. 2B.

A modification example of the first embodiment is described now.

In the first embodiment, the first extension portion 21E is disposed throughout from a first end portion to a second end portion of the first portion 21 in the direction DI parallel to the intersection line (FIG. 1A), and the second extension portion 22E is disposed throughout from a first end portion to a second end portion of the second portion 22 in the direction DI parallel to the intersection line. As a modification example of the first embodiment, the first extension portion 21E and the second extension portion 22E may be disposed in a part of the range between both end portions. However, not to reduce the freedom of arrangement of the first radiating elements 31 and the second radiating elements 32, preferably, at least a part of the first extension portion 21E and at least a part of the second extension portion 22E are located at the same position in the direction DI parallel to the intersection line.

In the first embodiment, the first radiating elements 31 and the second radiating elements 32 each form a patch antenna respectively with the first ground conductor 35 and the second ground conductor 36, but may form an antenna other than a patch antenna. For example, at least the first radiating elements 31 or the second radiating elements 32 may each form a dipole antenna.

Second Embodiment

Figure 5A:
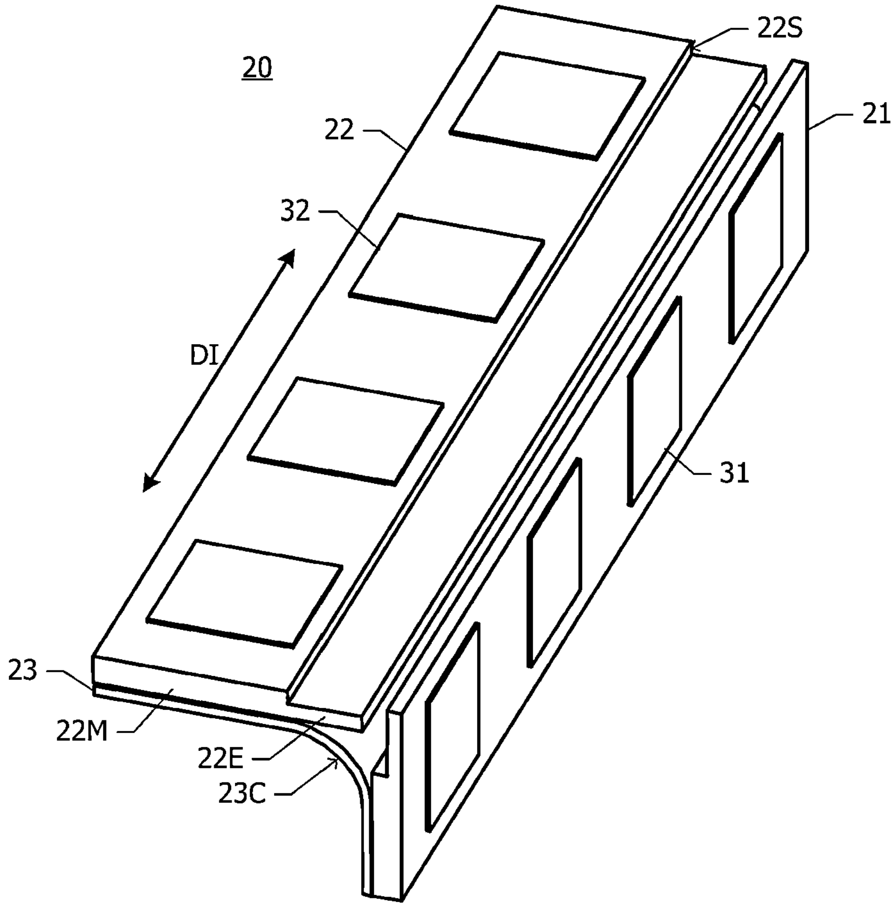
FIG. 5A and FIG. 5B are respectively a perspective view and a cross-sectional view of an antenna device according to a second embodiment.
Figure 5B:
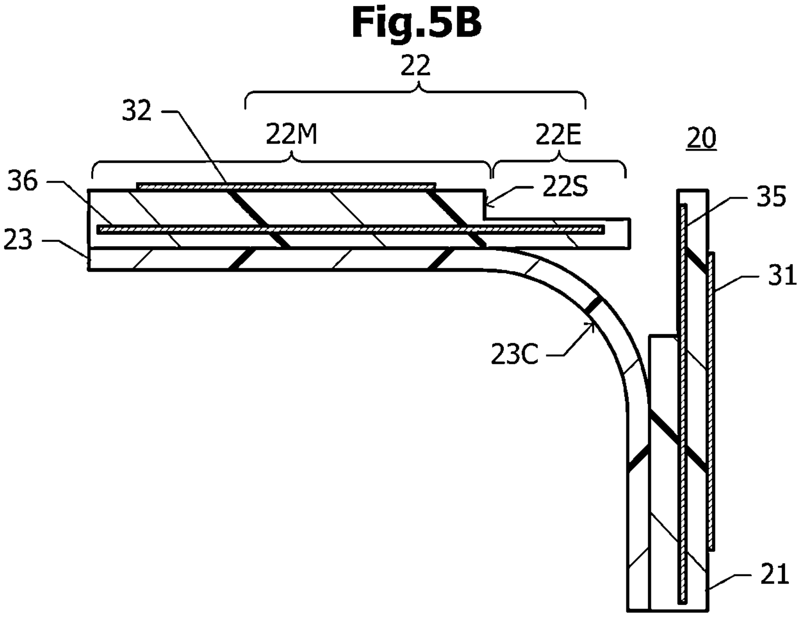
Figure 6:
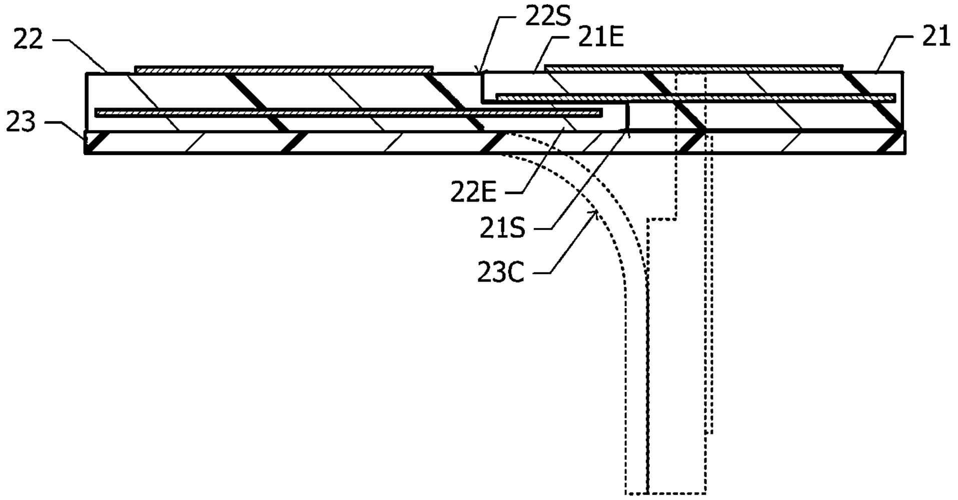
FIG. 6 is a cross-sectional view of a bent portion of the antenna device according to the second embodiment, in a state of being deformed into a flat shape.

An antenna device according to a second embodiment is described now with reference to FIG. 5A, FIG. 5B, and FIG. 6. Hereinbelow, the same components as those in the antenna device according to the first embodiment described with reference to FIG. 1A to FIG. 2C are not described.

FIG. 5A and FIG. 5B are respectively a perspective view and a cross-sectional view of an antenna device 20 according to the second embodiment. In the first embodiment (FIG. 1A and FIG. 1B), the surface of the second portion 22 facing outward is flat. In contrast, in the second embodiment, the surface of the second portion 22 facing outward has a second cliff 22S extending in the direction DI parallel to the intersection line. With respect to the second cliff 22S, one side of the second portion 22 located in or closer to the second extension portion 22E is thinner than the other side. The second cliff 22S may be disposed at the boundary between the second extension portion 22E and the second bonded joint 22M, in the second extension portion 22E, or in the second bonded joint 22M.

With respect to the second cliff 22S, in a relatively thick region of the outer surface of the second portion 22, multiple second radiating elements 32 are disposed. A part of the second ground conductor 36 is also disposed in a portion located closer to the end of the second extension portion 22E with respect to the second cliff 22S.

FIG. 6 is a cross-sectional view of a bent portion 23C (FIG. 5A and FIG. 5B) of the antenna device 20 according to the second embodiment, in a state of being deformed into a flat shape. FIG. 6 illustrates the bent portion 23C in a bent state with a broken line. The end surface of the first extension portion 21E of the first portion 21 faces the second cliff 22S of the second portion 22, and the end surface of the second extension portion 22E of the second portion 22 faces the first cliff 21S of the first portion 21. When the first surface 23P is viewed in a plan, a portion of the first portion 21 located closer to the end with respect to the first cliff 21S and a portion of the second portion 22 located closer to the end with respect to the second cliff 22S overlap each other. As in the first embodiment, the first portion 21 and the second portion 22 do not spatially interfere with each other. Thus, the antenna device 20 according to the second embodiment can be manufactured with the same method as the method for manufacturing the antenna device 20 according to the first embodiment illustrated in FIG. 2A, FIG. 2B, and FIG. 2C.

Preferable effects of the second embodiment are described now.

In the first embodiment (FIG. 1A and FIG. 1B), the thickness of the second portion 22 cannot be increased further than the height of the first cliff 21S of the first portion 21. In contrast, in the second embodiment, the second cliff 22S is formed at the outer surface of the second portion 22 to increase the thickness of the second portion 22 further than the height of the first cliff 21S. Increasing the thickness of the second portion 22 can increase the distance between the second radiating elements 32 and the second ground conductor 36. This structure can widen the band of the patch antennas formed from the second radiating elements 32 and the second ground conductor 36.

Disposing a part of the second ground conductor 36 in the second extension portion 22E can increase the area of the second ground conductor 36. Thus, patch antennas formed from the second radiating elements 32 and the second ground conductor 36 can achieve high gains.

Figure 7A:
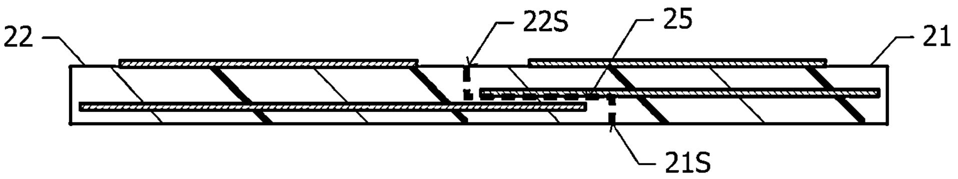
FIG. 7A, FIG. 7B, and FIG. 7C are cross-sectional views of the antenna device according to the second embodiment in the course of manufacture.
Figure 7B:
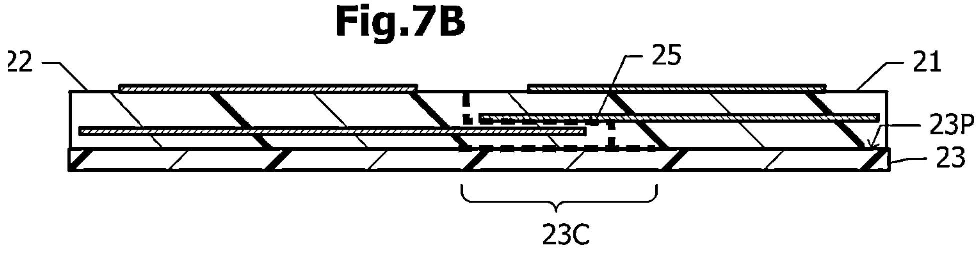
Figure 7C:
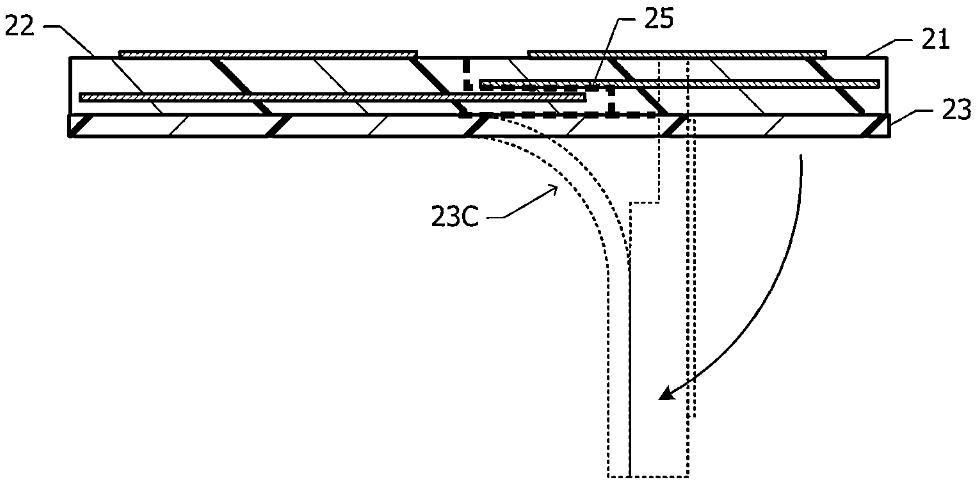

With reference to FIG. 7A, FIG. 7B, and FIG. 7C, another example of a method for manufacturing an antenna device according to a second embodiment is described. FIG. 7A, FIG. 7B, and FIG. 7C are cross-sectional views of the antenna device according to the second embodiment in the course of manufacture. In the first embodiment, the first portion 21 and the second portion 22 are separately manufactured as illustrated in FIG. 2A. In contrast, in the present manufacturing method, the first portion 21 and the second portion 22 are manufactured as one unit as illustrated in FIG. 7A.

When the first portion 21 and the second portion 22 are manufactured as one unit as illustrated in FIG. 7A, the first portion 21 and the second portion 22 form a detachable structure 25 at an interface between a portion of the first portion 21 located closer to the end with respect to the first cliff 21S and a portion of the second portion 22 located closer to the end with respect to the second cliff 22S. In addition, at the first cliff 21S and the second cliff 22S, a groove that isolates the first portion 21 and the second portion 22 from each other is formed. The groove may be formed by, for example, laser processing.

As illustrated in FIG. 7B, the first portion 21 and the second portion 22 formed into a unit with the detachable structure 25 is bonded to the first surface 23P of the connection portion 23. In this operation, the first portion 21 and the second portion 22 are not bonded to an area that is to serve as the bent portion 23C in the connection portion 23.

As illustrated in FIG. 7C, the bent portion 23C in the connection portion 23 is then bent. In FIG. 7C, the bent antenna device is drawn with a broken line. In this operation, the first portion 21 is detached from the second portion 22 at the portion forming the detachable structure 25.

As illustrated in FIG. 7A, FIG. 7B, and FIG. 7C, the first portion 21 and the second portion 22 may be manufactured into a unit, and then isolated.

Third Embodiment

Subsequently, an antenna device according to a third embodiment may be described with reference to FIG. 8, FIG. 9A, and FIG. 9B. Components the same as those in the antenna device according to the second embodiment described with reference to FIG. 5A to FIG. 6 are not described below.

Figure 8:
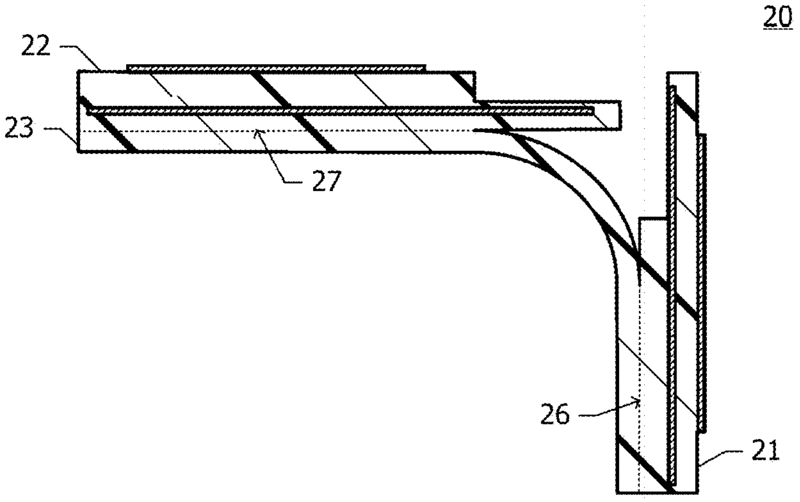
FIG. 8 is a cross-sectional view of an antenna device according to a third embodiment.

FIG. 8 is a cross-sectional view of an antenna device 20 according to the third embodiment. In the second embodiment (FIG. 5A and FIG. 5B), the first portion 21 and the second portion 22 are bonded to the connection portion 23 with, for example, solder. In contrast, in the third embodiment, the first portion 21, the second portion 22, and the connection portion 23 are integrally formed from the same material. In FIG. 8, a virtual interface 26 between the first portion 21 and the connection portion 23 and a virtual interface 27 between the second portion 22 and the connection portion 23 are drawn with broken lines. The first portion 21, the second portion 22, and the connection portion 23 may be formed from, for example, a liquid crystal polymer.

Figure 9A:
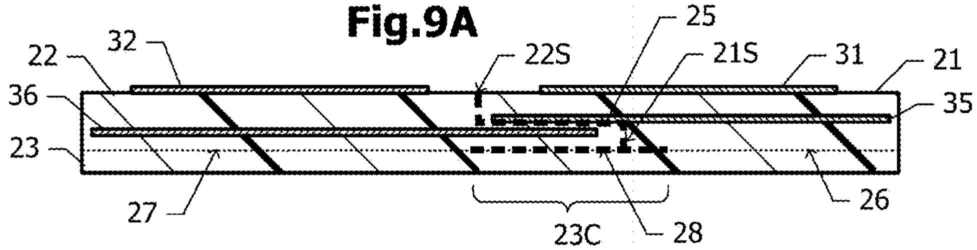
FIG. 9A and FIG. 9B are cross-sectional views of the antenna device according to the third embodiment in the course of manufacture.
Figure 9B:
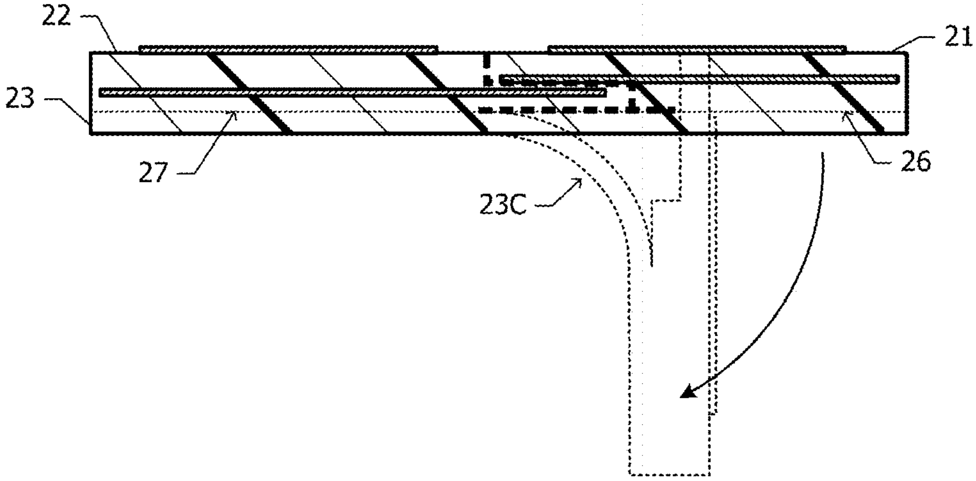

A method for manufacturing the antenna device 20 according to the third embodiment is described now with reference to FIG. 9A and FIG. 9B. FIG. 9A and FIG. 9B are cross-sectional views of the antenna device 20 according to the third embodiment in the course of manufacture.

As illustrated in FIG. 9A, a laminated structure including the first portion 21, the second portion 22, the connection portion 23, the first radiating elements 31, the second radiating elements 32, the first ground conductor 35, and the second ground conductor 36 is formed. The interface between a portion serving as the bent portion 23C when the antenna device 20 is complete, and each of portions serving as the first portion 21 and the second portion 22 when the antenna device 20 is complete is formed into a detachable structure 28 that is further detachable than the virtual interfaces 26 and 27 between the connection portion 23 and each of the first portion 21 and the second portion 22. The interface between the first portion 21 and the second portion 22 is formed into a detachable structure 25. In addition, each of the first cliff 21S and the second cliff 22S has an easily separable structure.

As illustrated in FIG. 9B, the connection portion 23 is bent. In this operation, detachment occurs in the detachable structures 25 and 28, and the bent portion 23C is bent. No detachment occurs at the virtual interfaces 26 and 27. The total thickness of the first portion 21 and the connection portion 23, and the total thickness of the second portion 22 and the connection portion 23 are greater than the thickness of the bent portion 23C. Thus, the portion at which the virtual interfaces 26 and 27 are located have higher stiffness than the bent portion 23C. Thus, the first portion 21 and the second portion 22 retain substantially a flat-board shape after the bent portion 23C is bent.

Preferable effects of the third embodiment are described now.

As in the second embodiment, the structure according to the third embodiment can widen the band of the patch antennas formed from the second radiating elements 32 and the second ground conductor 36, and the patch antennas formed from the second radiating elements 32 and the second ground conductor 36 can achieve high gains. In addition, the third embodiment involves neither a process of bonding the first portion 21 to the connection portion 23, nor a process of bonding the second portion 22 to the connection portion 23. Thus, the third embodiment can reduce the number of processes.

Fourth Embodiment

Figure 10:
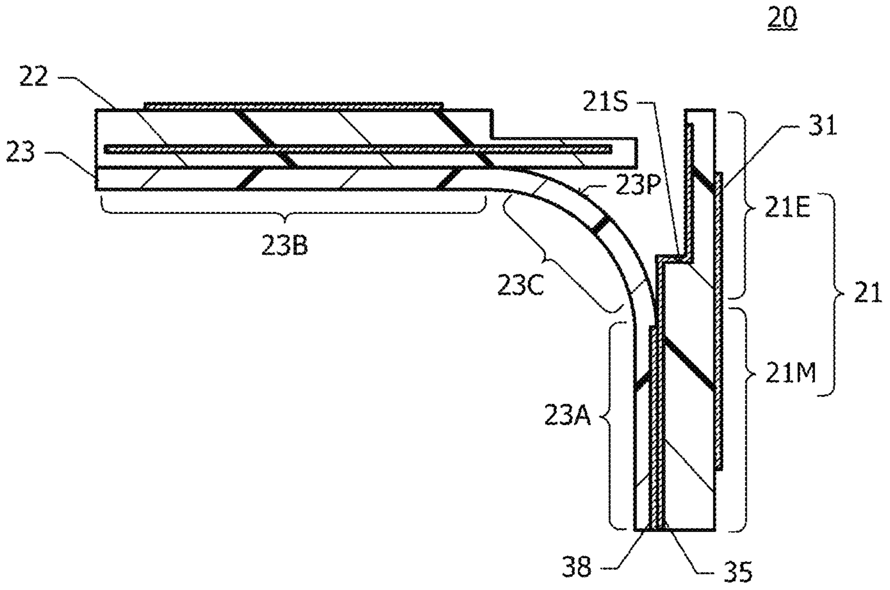
FIG. 10 is a cross-sectional view of an antenna device according to a fourth embodiment.

An antenna device according to a fourth embodiment is described now with reference to FIG. 10. Components the same as those in the antenna device according to the second embodiment described with reference to FIG. 5A, FIG. 5B, and FIG. 6 are not described below.

FIG. 10 is a cross-sectional view of an antenna device 20 according to the fourth embodiment. In the first embodiment (FIG. 1B), the first ground conductor 35 disposed on the first portion 21 is formed from a flat conductor layer. In contrast, in the fourth embodiment, the first ground conductor 35 is disposed over the inner surface of the first portion 21 from one side to the other side across the first cliff 21S. More specifically, the first ground conductor 35 includes a stepped portion. The first radiating elements 31 and the stepped first ground conductor 35 form patch antennas.

The first ground conductor 35 is bonded to a first ground land 38 disposed on the first surface 23P in the first flat board portion 23A in the connection portion 23 with solder.

Preferable effects of the fourth embodiment are described now.

In the fourth embodiment, at a part of each first radiating element 31, the distance between the first radiating element 31 and the first ground conductor 35 is increased further than in a structure of the first embodiment (FIG. 1B). This structure can widen the band of the patch antennas formed from the first radiating elements 31 and the first ground conductor 35.

Fifth Embodiment

Figure 11:
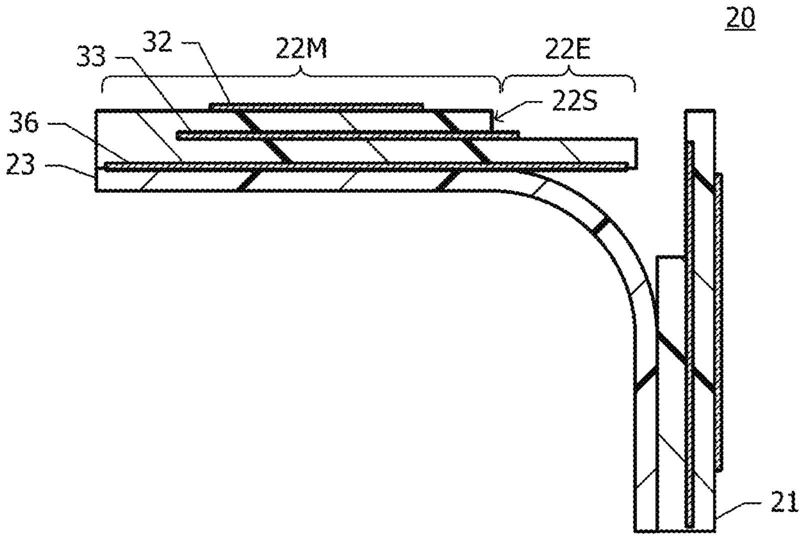
FIG. 11 is a cross-sectional view of an antenna device according to a fifth embodiment.

An antenna device according to a fifth embodiment is described now with reference to FIG. 11. Components the same as those in the antenna device according to the second embodiment described with reference to FIG. 5A, FIG. 5B, and FIG. 6 are not described below.

FIG. 11 is a cross-sectional view of an antenna device 20 according to the fifth embodiment. In addition to the multiple second radiating elements 32 disposed on the outer surface of the second portion 22 of the antenna device (FIG. 5A and FIG. 5B) according to the second embodiment, the fifth embodiment includes multiple third radiating elements 33 at the second portion 22. The second ground conductor 36 is disposed on the inner surface of the second portion 22. Each of the third radiating elements 33 is located to enclose a corresponding one second radiating element 32 when the outer surface of the second portion 22 is viewed in a plan. The third radiating elements 33 are disposed between the second ground conductor 36 and the second radiating elements 32 in a thickness direction of the second portion 22.

A part of each third radiating element 33 is disposed on the outer surface of a relatively thin portion and located closer to the end with respect to the second cliff 22S, and another part of the third radiating element 33 is disposed in the second portion 22. In addition, the third radiating elements 33 extend into the second extension portion 22E. The second ground conductor 36 and the third radiating elements 33 form patch antennas. The third radiating elements 33 function as ground conductors for the second radiating elements 32.

The resonant frequency of the third radiating elements 33 is lower than the resonant frequency of the second radiating elements 32. For example, the resonant frequency of the third radiating elements 33 is 28 GHz, and the resonant frequency of the second radiating elements 32 is 39 GHz.

Preferable effects of the fifth embodiment are described now.

In the fifth embodiment, two radiating elements with different resonant frequencies are disposed on the second portion 22. Thus, the radiating elements disposed on the second portion 22 can cover two frequency bands. The third radiating elements 33 are disposed to extend into the second extension portion 22E, and thus the area of the third radiating elements 33 can be increased. When the antenna device 20 is disposed at a corner of the housing, the third radiating elements 33 can be located near the corner of the housing.

Sixth Embodiment

Figure 12A:
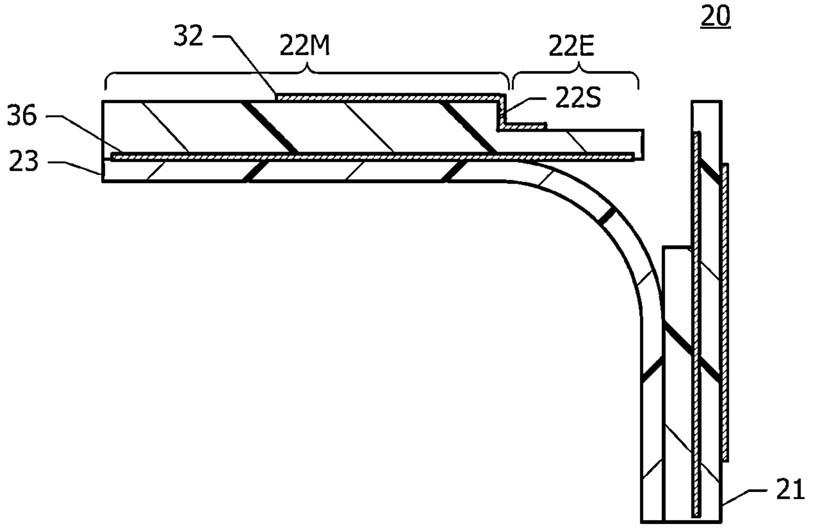
FIG. 12A is a cross-sectional view of an antenna device according to a sixth embodiment.
Figure 12B:
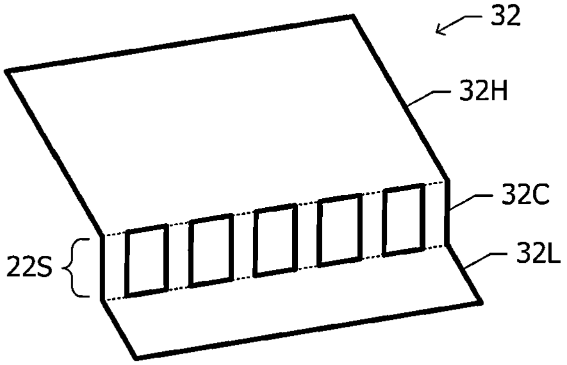
FIG. 12B is a perspective view of one second radiating element.

An antenna device according to a sixth embodiment is described now with reference to FIG. 12A and FIG. 12B. Components the same as those in the antenna device according to the second embodiment described with reference to FIG. 5A, FIG. 5B, and FIG. 6 are not described below.

FIG. 12A is a cross-sectional view of an antenna device 20 according to a sixth embodiment. In the second embodiment (FIG. 5A and FIG. 5B), the multiple second radiating elements 32 are disposed on the outer surface of the second portion 22 in a relatively thick portion, without being disposed at a portion located closer to the end with respect to the second cliff 22S. In contrast, in the sixth embodiment, each of the multiple second radiating elements 32 is disposed on the outer surface of the second portion 22 across the second cliff 22S. The second radiating elements 32 and the second ground conductor 36 form patch antennas.

FIG. 12B is a perspective view of one second radiating element 32. The second radiating element 32 includes a portion 32H disposed on the outer surface of the relatively thick portion with respect to the second cliff 22S, a portion 32L disposed on the outer surface of the relatively thin portion with respect to the second cliff 22S, and portions 32C disposed on the surface forming the second cliff 22S and connecting the two portions 32H and 32L to each other. The multiple portions 32C are disposed at intervals in the direction in which the second cliff 22S extends. The connecting portions 32C may continuously disposed in the direction in which the second cliff 22S extends throughout the areas of the two portions 32H and 32L.

Preferable effects of the sixth embodiment are described now.

In the sixth embodiment, the second radiating elements 32 are disposed at a portion closer to the end with respect to the second cliff 22S. Thus, when the antenna device 20 is disposed at the corner of the housing, the second radiating elements 32 can be located closer to the corner of the housing.

Seventh Embodiment

Figure 13:
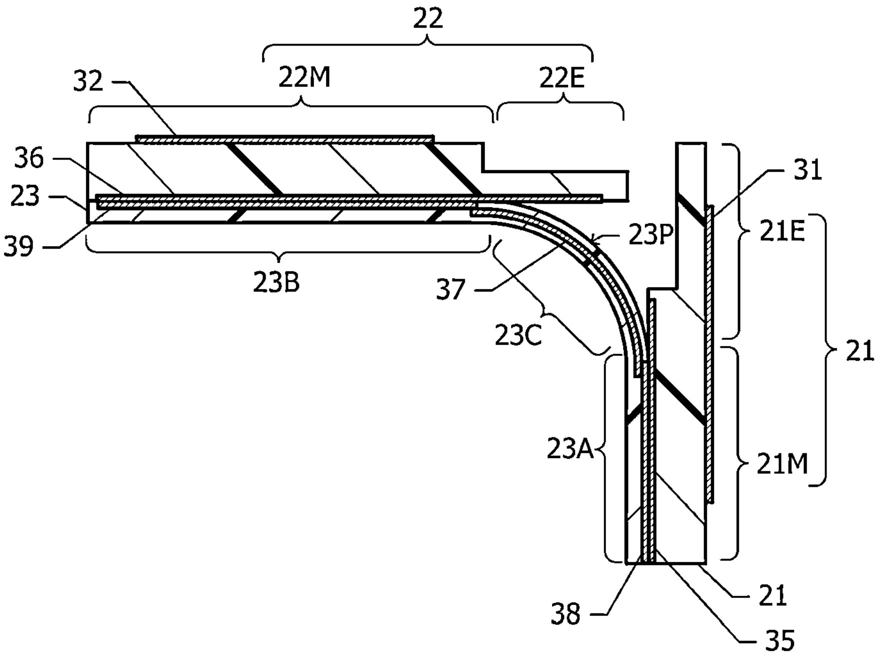
FIG. 13 is a cross-sectional view of an antenna device according to a seventh embodiment.

With reference to FIG. 13, an antenna device according to a seventh embodiment is described now. Components the same as those in the antenna device according to the second embodiment described with reference to FIG. 5A, FIG. 5B, and FIG. 6 are not described below.

FIG. 13 is a cross-sectional view of an antenna device 20 according to a seventh embodiment. In the second embodiment (FIG. 5B), the first ground conductor 35 disposed on the first portion 21 and the second ground conductor 36 disposed on the second portion 22 are not electrically connected to each other. In contrast, in the seventh embodiment, the first ground conductor 35 and the second ground conductor 36 are electrically connected to each other with a ground connection wire 37 disposed at the connection portion 23.

More specifically, the first ground land 38 and a second ground land 39 are disposed on the first surface 23P of the connection portion 23 respectively in the first flat board portion 23A and the second flat board portion 23B. The first ground land 38 and the second ground land 39 are connected to each other with the ground connection wire 37 disposed in the bent portion 23C. The first ground conductor 35 is disposed on the inner surface of the first bonded joint 21M of the first portion 21, and the second ground conductor 36 is disposed on the inner surface of the second bonded joint 22M of the second portion 22. The second ground conductor 36 further extends to the inner surface of the second extension portion 22E. The first ground conductor 35 and the second ground conductor 36 are respectively connected to the first ground land 38 and the second ground land 39 with solder (not illustrated).

Preferable effects of the seventh embodiment are described now.

In the seventh embodiment, the second ground conductor 36 is connected to the first ground conductor 35, and the second ground conductor 36 is disposed to extend to the second extension portion 22E to be located closer to the first radiating elements 31. Thus, the second ground conductor 36 can operate as a ground for the first radiating elements 31. To substantially increase the ground area of the first radiating elements 31, the gain of the patch antennas including the first radiating elements 31 can be enhanced.

Eighth Embodiment

Figure 14:
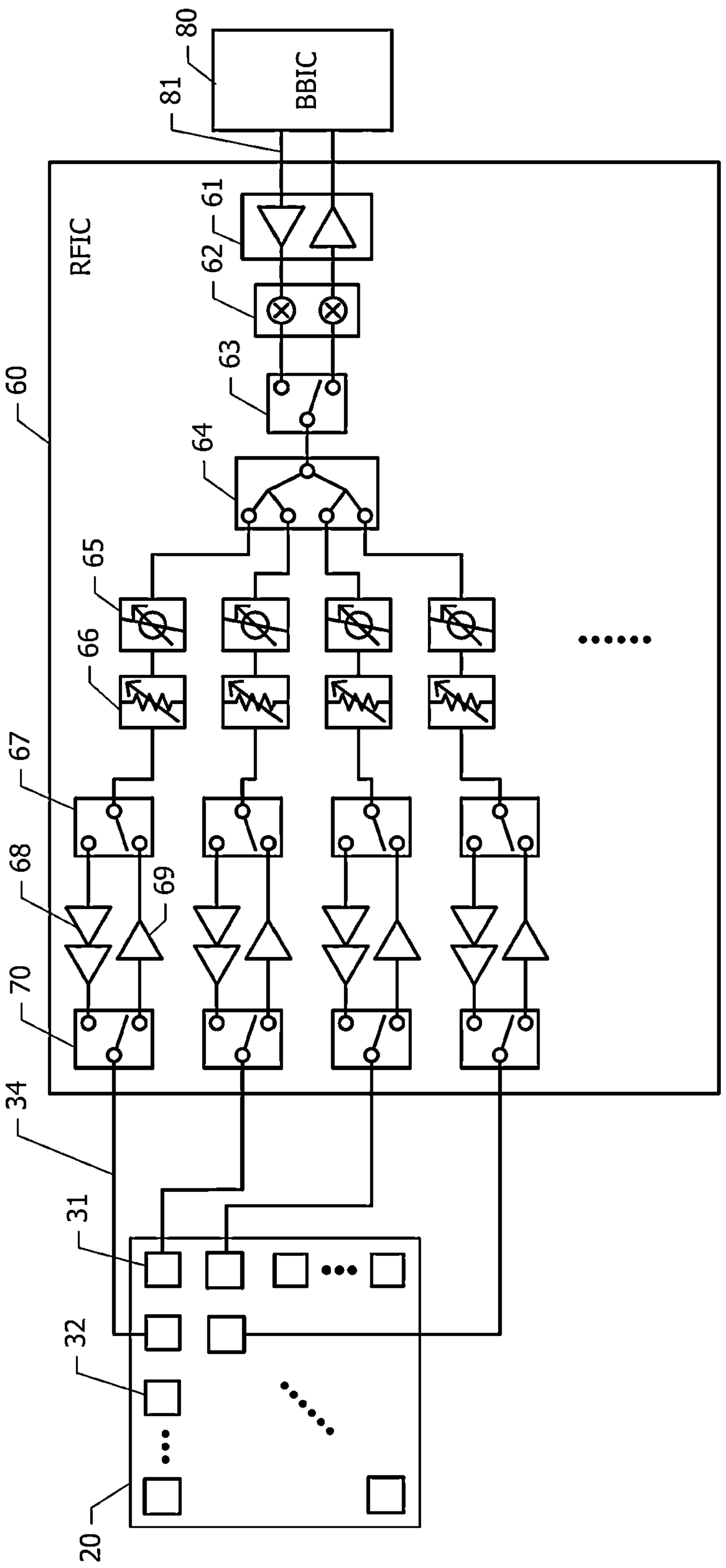
FIG. 14 is a block diagram of a communication device according to an eighth embodiment.
Figure 15:
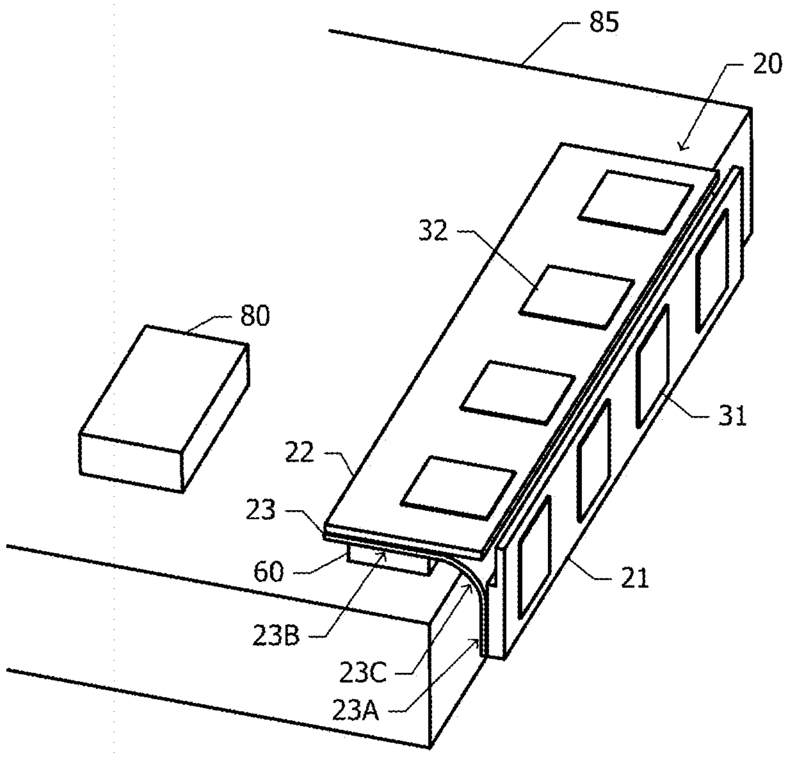
FIG. 15 is a perspective view of the communication device according to the eighth embodiment.

A communication device according to an eighth embodiment is described now with reference to FIG. 14 and FIG. 15. The communication device according to the eighth embodiment includes the antenna device according to any of the first to seventh embodiments.

FIG. 14 is a block diagram of a communication device according to an eighth embodiment, and FIG. 15 is a perspective view of the communication device according to the eighth embodiment.

The communication device according to the eighth embodiment includes a baseband integrated circuit (BBIC) 80, a radio frequency integrated circuit (RFIC) 60, and an antenna device 20. The antenna device 20 according to any of the first to seventh embodiments is used as the antenna device 20. The antenna device 20 includes multiple first radiating elements 31 and multiple second radiating elements 32. When the antenna device 20 (FIG. 11) according to the fifth embodiment is used as the antenna device 20, the antenna device 20 further includes the multiple third radiating elements 33 (FIG. 11).

As illustrated in FIG. 15, the radio frequency integrated circuit 60 is mounted on the inner surface of the second flat board portion 23B in the connection portion 23. The antenna device 20 and the radio frequency integrated circuit 60 are mounted on a board 85 such as a motherboard. The inner surface of the bent portion 23C faces a ridge at which the component mount surface of the board 85 and an end surface of the board 85 cross. For example, the inner surface of the second portion 22 of the antenna device 20 faces the component mount surface of the board 85 with the connection portion 23 and the radio frequency integrated circuit 60 interposed therebetween, and the inner surface of the first portion 21 faces one end surface of the board 85 with the connection portion 23 interposed therebetween.

As illustrated in FIG. 14, an intermediate-frequency signal is transmitted and received between the baseband integrated circuit 80 and the radio frequency integrated circuit 60 through a wire 81. As illustrated in FIG. 15, the baseband integrated circuit 80 is mounted on the component mount surface of the board 85.

The radio frequency integrated circuit 60 includes an intermediate-frequency amplifier 61, an up-down converter mixer 62, a transmission reception switch 63, a power divider 64, multiple phase shifters 65, multiple attenuators 66, multiple transmission reception switches 67, multiple power amplifiers 68, multiple low-noise amplifiers 69, and multiple transmission reception switches 70. The multiple transmission reception switches 70 are connected to the multiple first radiating elements 31 and the second radiating elements 32 with feeders 34.

First, the transmission function is described. An intermediate-frequency signal is input from the baseband integrated circuit 80 into the up-down converter mixer 62 through the intermediate-frequency amplifier 61. The up-down converter mixer 62 upconverts the intermediate-frequency signal to generate a high frequency signal. The generated high frequency signal is input into the power divider 64 through the transmission reception switch 63. Each of high frequency signals divided by the power divider 64 is input into the first radiating elements 31 and the second radiating elements 32 through the corresponding phase shifter 65, the corresponding attenuator 66, the corresponding transmission reception switch 67, the corresponding power amplifiers 68, the corresponding transmission reception switch 70, and the corresponding feeder 34.

The reception function is then described. The high frequency signals received by the first radiating elements 31 and the second radiating elements 32 are input into the power divider 64 through the feeders 34, the transmission reception switches 70, the low-noise amplifiers 69, the transmission reception switches 67, the attenuators 66, and the phase shifters 65. A high frequency signal combined by the power divider 64 is input into the up-down converter mixer 62 through the transmission reception switch 63. The up-down converter mixer 62 downconverts the high frequency signal to generate an intermediate-frequency signal. The generated intermediate-frequency signal is input into the baseband integrated circuit 80 through the intermediate-frequency amplifier 61. Instead, the up-down converter mixer 62 may employ a direct conversion, or directly down-converting a high frequency signal to a baseband signal.

Preferable effects of the eighth embodiment are described now.

The antenna device 20 according to any of the first to seventh embodiments is used as the antenna device 20 included in the communication device according to the eighth embodiment. Thus, the first radiating elements 31 and the second radiating elements 32 can cover a wide range including the direction in which the component mount surface of the board 85 (FIG. 15) faces and the direction in which one end surface of the board 85 faces. In addition, arranging the antenna device 20 at the corner of the housing can effectively uses the space in the housing, particularly, the space at the corner.

Ninth Embodiment

Figure 16:
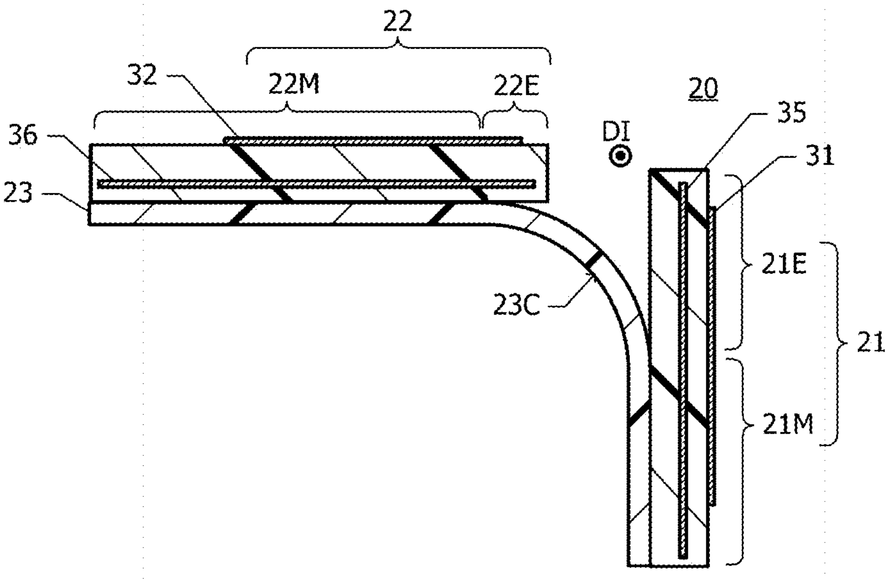
FIG. 16 is a cross-sectional view of an antenna device according to a ninth embodiment.
Figure 17:
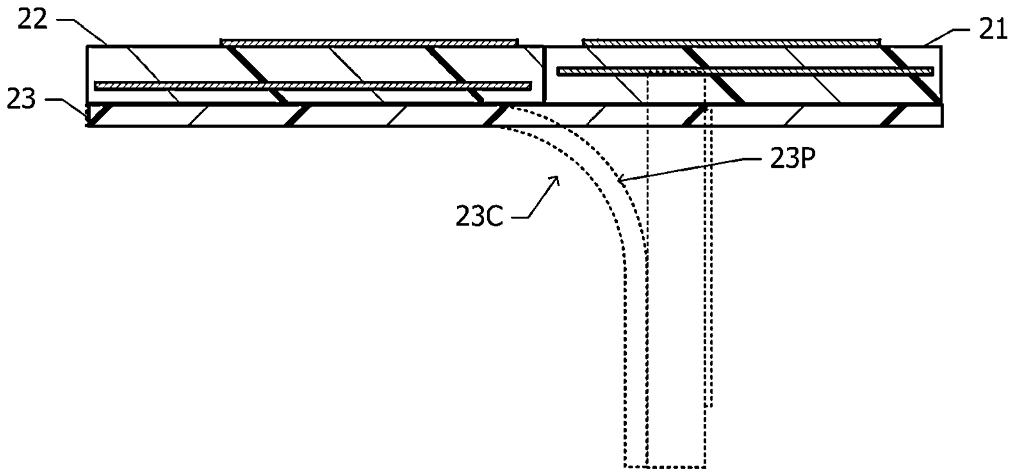
FIG. 17 is a cross-sectional view of a bent portion of the antenna device according to the ninth embodiment in a state of being deformed into a flat shape.

An antenna device according to a ninth embodiment is described now with reference to FIG. 16 and FIG. 17. Components the same as those in the antenna device according to the first embodiment described with reference to FIG. 1A to FIG. 2C are not described below.

FIG. 16 is a cross-sectional view of an antenna device 20 according to the ninth embodiment. In the first embodiment (FIG. 1A and FIG. 1B), the first cliff 21S is formed at the inner surface of the first portion 21, and thus a portion located closer to the end with respect to the first cliff 21S is further thinned than the other portion. In contrast, in the ninth embodiment, the first portion 21 has a flat inner surface, and has a uniform thickness. The second portion 22 also has a uniform thickness.

As in the case of the first embodiment, the first portion 21 and the second portion 22 respectively include the first extension portion 21E and the second extension portion 22E. The total length of the first extension portion 21E and the second extension portion 22E in the extension direction is shorter than the length of the antenna device 20 according to the first embodiment in the extension direction.

FIG. 17 is a cross-sectional view of the bent portion 23C in a state of being deformed into a flat shape. The bent portion 23C before being deformed is drawn with a broken line. As in the case of the antenna device 20 according to the first embodiment, in a state where the bent portion 23C is deformed into a flat shape, the first portion 21 and the second portion 22 do not spatially interfere with each other. When the first surface 23P of the connection portion 23 deformed into a flat shape is viewed in a plan, the first portion 21 and the second portion 22 do not overlap each other in the ninth embodiment, although the first portion 21 and the second portion 22 partially overlap in the first embodiment (FIG. 2C). More specifically, the end surface of the first portion 21 and the end surface of the second portion 22 face each other.

Preferable effects of the ninth embodiment are described now.

As in the first embodiment, also in the ninth embodiment, the multiple first radiating elements 31 and the multiple second radiating elements 32 can be located at the same position in the direction DI parallel to the intersection line (direction perpendicular to the plan in FIG. 16). The multiple first radiating elements 31 and the multiple second radiating elements 32 can be arranged at smaller intervals. In addition, compared to an antenna device not including the first extension portion 21E and the second extension portion 22E, the first radiating elements 31 and the second the radiating element 32 can be arranged closer to the corner of the housing.

The above embodiments are mere examples, and components between different embodiments may naturally be partially replaced or combined with each other. The same operation effects in the same structures between multiple embodiments are not redundantly described for each embodiment. The present disclosure is not limited to the above embodiments. It would be apparent to persons having ordinary skill in the art that, for example, various modifications, improvement, or combinations may be made in the present disclosure.

REFERENCE SIGNS LIST

20 antenna device
21 first portion
21E first extension portion
21F surface intersecting thickness direction
21M first bonded joint
21R first reference plane
21S first cliff
22 second portion
22E second extension portion
22F surface intersecting thickness direction
22M second bonded joint
22R second reference plane
22S second cliff
23 connection portion
23A first flat board portion
23B second flat board portion
23C bent portion
23P first surface
23S second surface
25 detachable structure
26 virtual interface between first portion and connection portion
27 virtual interface between second portion and connection portion
28 detachable structure
31 first radiating element
32 second radiating element
32C, 32H, 32L portion of second radiating element
33 third radiating element
34 feeder
35 first ground conductor
36 second ground conductor
37 ground connection wire
38 first ground land
39 second ground land
60 radio frequency integrated circuit (RFIC)
61 intermediate-frequency amplifier
62 up-down converter mixer
63 transmission reception switch
64 power divider
65 phase shifter
66 attenuator
67 transmission reception switch
68 power amplifier
69 low-noise amplifier
70 transmission reception switch
80 baseband integrated circuit
81 wire
85 board

The invention claimed is:

1. An antenna device, comprising:

a connection portion having a first surface and a second surface opposite to the first surface;

a first portion and a second portion connected to the first surface of the connection portion;

a first radiating element disposed on the first portion; and a second radiating element disposed on the second portion, wherein the connection portion includes a first flat board portion, a bent portion extending from the first flat board portion, and bent to have the first surface facing outward, and a second flat board portion further extended from the bent portion, wherein the first portion includes a first extension portion connected to the first surface in the first flat board portion, and extending toward the bent portion from a boundary between the first flat board portion and the bent portion, wherein the second portion includes a second extension portion connected to the first surface in the second flat board portion, and extending toward the bent portion from a boundary between the second flat board portion and the bent portion, wherein at least a part of the first extension portion and at least a part of the second extension portion are located at the same position in a first direction parallel to an intersection line of the plane along which the first flat board portion extends and the plane along which the second flat board portion extends, wherein at least a part of the first radiating element is disposed at the first extension portion, wherein a first distance is a distance in a direction perpendicular to a first reference plane from the first reference plane to a surface intersecting a thickness direction of the first extension portion, and the first reference plane is orthogonal to the first surface in the first flat board portion and parallel to the first direction, wherein a second distance is a distance in a direction perpendicular to a second reference plane from the second reference plane to a surface intersecting a thickness direction of the second extension portion, and the second reference plane is orthogonal to the first surface in the second flat board portion and parallel to the first direction, wherein a third distance is a shortest distance along the first surface from the first reference plane to the second reference plane, wherein a sum of the first distance and the second distance at the same height from the first surface is smaller than or equal to the third distance, and wherein a sum of a maximum value of the first distance and a maximum value of the second distance is longer than the third distance.

2. The antenna device according to claim 1, wherein a first cliff is formed on a surface of the first portion facing the connection portion, and a portion of the first extension portion located closer to an end of the first extension portion with respect to the first cliff has a smaller thickness than a portion of the first extension portion connected to the first flat board portion.

3. The antenna device according to claim 2, wherein the second extension portion has a thickness equal to or smaller than a height of the first cliff.

4. The antenna device according to claim 3, further comprising:

a first ground conductor disposed at the first portion, wherein the first radiating element and the first ground conductor form a patch antenna.

5. The antenna device according to claim 4, wherein at least a part of the second radiating element is disposed at the second extension portion.

6. The antenna device according to claim 3, wherein a second cliff is disposed on a surface of the second portion facing away from the connection portion, and wherein a portion of the second extension portion located closer to an end of the second extension portion with respect to the second cliff has a smaller thickness than a portion of the second extension portion connected to the second flat board portion.

7. The antenna device according to claim 6, further comprising:

a second ground conductor disposed at the second portion, wherein the second radiating element is disposed on a side of the second cliff opposite to the second extension portion, and a part of the second ground conductor is disposed at the second extension portion, and the second radiating element and the second ground conductor form a patch antenna.

8. The antenna device according to claim 4, further comprising:

a second ground conductor disposed at the second portion; and a ground connection wire disposed at the connection portion to connect the first ground conductor and the second ground conductor to each other, wherein the second radiating element and the second ground conductor form a patch antenna.

9. The antenna device according to claim 8, wherein the first portion, the second portion, and the connection portion are formed from the same material.

10. The antenna device according to claim 8, wherein the first portion, the second portion, and the connection portion are formed from different components.

11. A communication device, comprising:

the antenna device according to claim 10; and a circuit that provides high frequency signals to the first radiating element and the second radiating element.

12. The antenna device according to claim 2, wherein a second cliff is disposed on a surface of the second portion facing away from the connection portion, and wherein a portion of the second extension portion located closer to an end of the second extension portion with respect to the second cliff has a smaller thickness than a portion of the second extension portion connected to the second flat board portion.

13. The antenna device according to claim 12, further comprising:

a second ground conductor disposed at the second portion, wherein the second radiating element is disposed on a side of the second cliff opposite to the second extension portion, and a part of the second ground conductor is disposed at the second extension portion, and the second radiating element and the second ground conductor form a patch antenna.

14. The antenna device according to claim 1, further comprising:

a first ground conductor disposed at the first portion, wherein the first radiating element and the first ground conductor form a patch antenna.

15. The antenna device according to claim 14, wherein at least a part of the second radiating element is disposed at the second extension portion.

16. The antenna device according to claim 2, further comprising:

a first ground conductor disposed at the first portion, wherein the first radiating element and the first ground conductor form a patch antenna.

17. The antenna device according to claim 16, wherein at least a part of the second radiating element is disposed at the second extension portion.

18. A communication device, comprising:

the antenna device according to claim 2; and a circuit that provides high frequency signals to the first radiating element and the second radiating element.

19. A communication device, comprising:

the antenna device according to claim 2; and a circuit that provides high frequency signals to the first radiating element and the second radiating element.

20. A communication device, comprising:

the antenna device according to claim 3; and a circuit that provides high frequency signals to the first radiating element and the second radiating element.

* * * * *